Oct. 7, 1947. H. G. KIPKE 2,428,712
SOLENOID AND PLUNGER THEREFOR
Filed Jan. 17, 1944.
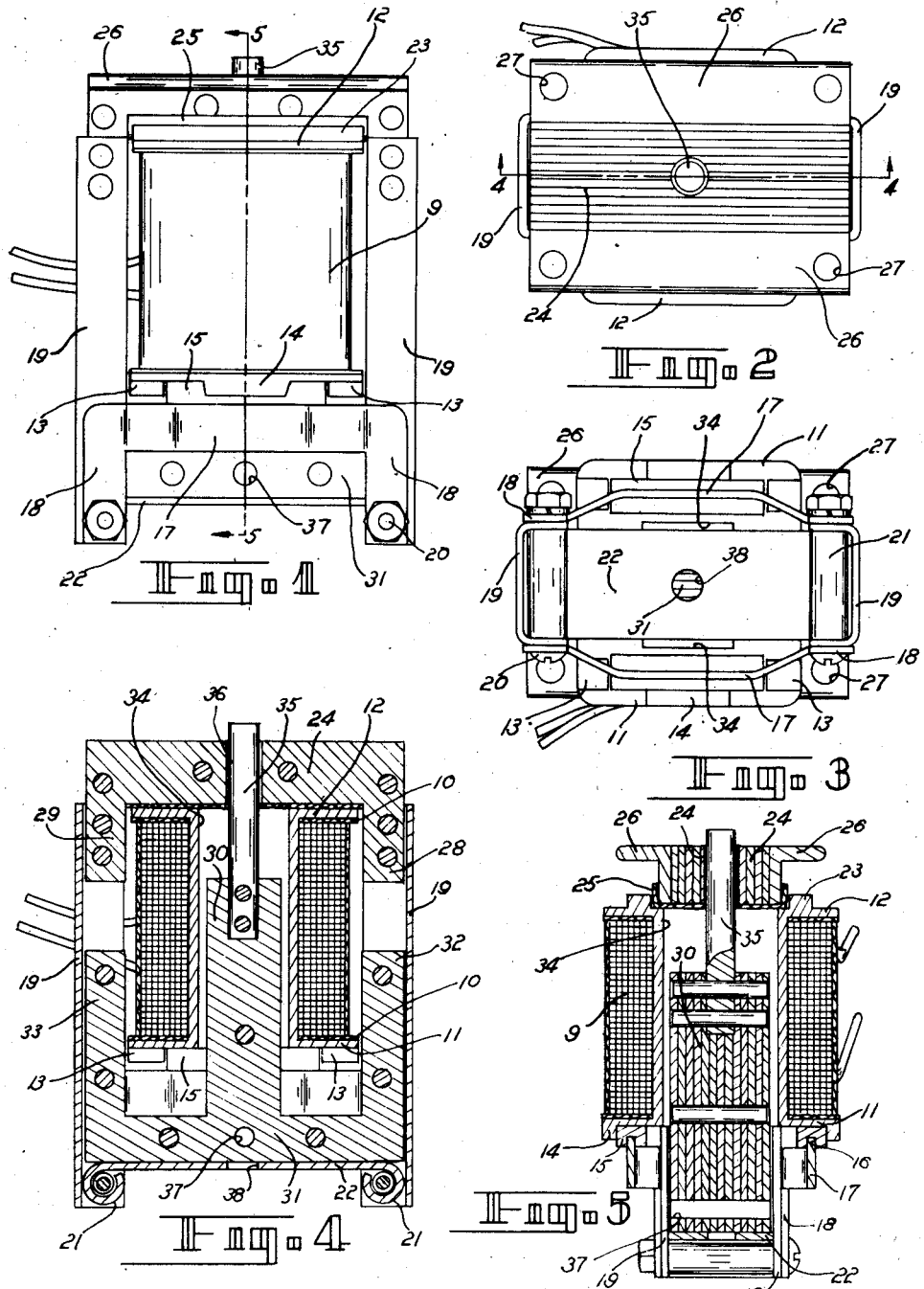
INVENTOR.
HARRY G. KIPKE
BY
HIS ATTORNEY Patented Oct. 7, 1947

2,428,712

UNITED STATES PATENT OFFICE 2,428,712

SOLENOID AND PLUNGER THEREFOR

Harry G. Kipke, Detroit, Mich., assignor, by mesne assignments, to Adolph G. Martin, Dearborn, Mich.

Application January 17, 1944, Serial No. 518,631

8 Claims. (Cl. 175—341)

My invention relates to a new and useful improvement in a solenoid adapted for use in operating various mechanisms such as valves, controls and the like where a reciprocating action can be utilized.

It is an object of the present invention to provide a solenoid which will be simple of structure, economical to manufacture, compact, possessed of a minimum number of parts and easily and quickly assembled and disassembled.

It is another object of the present invention to provide a solenoid so constructed and arranged that the coil may be readily removed and replaced without disturbing the mountings of the supporting form.

Another object of the invention is the provision of a solenoid having a built-in and self-contained pusher so as to eliminate extra expense and material in adapting a solenoid to push type of work.

Another object of the invention is the provision of a solenoid so constructed and arranged that the pusher will ensure the proper stroke required for operating valves and the like with which it is associated so that proper seating will be effected.

Another object of the invention is the provision of a solenoid adapted for either a push or a pull operation.

Another object of the invention is the provision of a quiet operating solenoid and one in which the wear on the parts is reduced to a minimum.

Another object of the invention is the provision of a solenoid so constructed and arranged that when it is energized a fully sealed field is set up around the coil, thus preventing the accumulation of metallic substances on the solenoid.

Another object of the invention is the provision of a solenoid so constructed that a spring effect is obtained when seating, thus cushioning the blow and reducing the wear on the various parts.

Another object of the invention is the provision of a solenoid so constructed and arranged that the armature provides a high torque and dual field effect due to its design.

Other objects will appear hereafter.

It is recognized that various modifications and changes may be made in the detail of the structure illustrated without departing from the spirit and scope of the invention and it is intended that such variations shall be embraced within the scope of the claims which form a part of this specification.

Forming a part of this specification are drawings in which,

Fig. 1 is a side elevational view of the invention,

Fig. 2 is a top plan view of the invention,

Fig. 3 is a bottom plan view of the invention,

Fig. 4 is a sectional half taken on line 4—4 of Fig. 2,

Fig. 5 is a sectional half taken on line 5—5 of Fig. 1.

The invention comprises a coil 9 insulated by insulation 10 from the end plates 11 and 12. The end plate 11 is provided with two sets of downwardly extending bosses 13 and 14. The bosses 14 engage the outer face on each of the two insulating blocks 15 while the bosses 13 engage the end faces of these same insulating blocks 15. These insulating blocks 15 are provided with grooves 16 in which engage the cross-bars 17 of the yokes 18, the legs of which are secured to the lower ends of the channel shaped legs 19. The bolts 20 which serve to secure the legs 18 and 19 together pass through knuckles 21 formed on opposite ends of the resilient metallic end plate 22 against which the cross-head of the armature will engage when the solenoid is deenergized and the valve is in a closed position.

The end plate 12 is provided with the outwardly projecting ribs 23 between which engages the laminated end plate 24, this end plate 24 being insulated from the end of wall 12 by means of insulation strip 25. Secured to and projecting outwardly from end plate 24 are supporting flanges 26 having openings 27 through which bolts, screws or other fastening means may be projected.

This end plate is provided with the inwardly projecting laminated legs 28 and 29 which project into channels of the legs 19 and are suitably secured thereto.

The armature comprises a T-shaped structure embodying the stem 30, cross-head 31 and side arms or legs 32 and 33. This armature is formed from laminations suitably secured together by rivets as shown.

The stem 30 slideably engages in the bore 34 and the legs or arms 32 and 33 slideably engage in the channels of the legs 19. Permanently secured to the stem 30 is a push rod 35 which projects through the opening 36 formed in member 24.

If it is considered that the device is used with a valve normally spring-pressed to closed position the push rod 35 would be connected to the rod stem and when the coil is deenergized the valve stem would move the armature into the position shown in Fig. 4. Part 31 engages against plate 22 in this movement. Due to the construction of plate 22 a certain flexibility or resiliency in plate 22 is obtained so that a silent seating of the parts is effected and sufficient yieldability is provided to assure proper seating of the valve and a closing of the field so as to eliminate a burning of the coil. By mounting the push rod 35 permanently in stem 30 a proper stroke on the valve may be obtained so that the valve will always move to closed position and armature will seat properly.

Formed in the member 31, is a hole 37 provided so that the mechanism may be used in a pull operation as well as a push operation. The end plate 22 is adapted to retain the armature in its assigned relationship to the work base and has an opening 38 therein adapted to provide access to the back side of the armature cross-head 31.

By having the legs or arms 32 and 33 guided in the channels of the legs 19 a silent operation is obtained and proper lamination is always maintained. The type of construction embodying particularly the legs 32 and 33 and stem 30 and cross-head 31 engaging the plate 32 is such as to assure a durable construction while at the same time, when the coil is energized a fully sealed field is set up around the coil, the ends of the legs 32 and 33 engaging the ends of the legs 28 and 29. This eliminates picking up foreign metallic particles by eliminating the magnetism or magnetic field which would otherwise be set up.

In assembling the device, after the legs 19 have been secured to the legs 28 and 29, the coil is inserted into the position shown in Fig. 4, and the armature is positioned in the position shown in Fig. 4. The bolts are then projected through the legs 19 and the knuckles 21, thus completing the assembly.

In use, it is customary to attach the flange 26 to a suitable supporting body and with the pusher 35 engaging the mechanism which is to be operated. When the mounting has been completed and it is desired to remove and replace the coil it is but necessary to remove the bolts 20, whereupon the plate 22 and the yoke embodying the cross-part 17 are slipped off the legs 19. This permits the armature and the coil to be removed by sliding the same upwardly. When a new coil has been replaced the parts are again assembled as shown in Fig. 4. It is thus believed to be obvious that the removal and replacement of a coil is an easy and simple operation which may actually be performed without disturbing the mountings of the supporting flanges 26.

What I claim as new is:

1. A solenoid of the class described comprising a coil; a supporting metallic frame embracing said coil and extending axially thereof, a pair of side legs having end faces; a metallic core slidably projected into said coil and slidable coaxially therewith; a metallic cross-head connected to one end of said core and legs connected to each end of said cross-head and extended axially so as to contact with the end faces of said first-mentioned legs when the coil is energized.

2. A solenoid of the class described comprising a coil; a metallic frame embracing said coil and a pair of side legs extending axially of said coil; a metallic core slidably mounted in said coil; a metallic cross-head mounted on said core and extending laterally therefrom on opposite sides thereof; and a metallic leg mounted on each end of said cross-head engaging said first-mentioned legs in abutting contact to provide a fully sealed field around the coil upon the energizing of the coil.

3. A solenoid of the class described comprising a coil; a laminated metallic U-shaped member positioned at one end of said coil and having the legs thereof extended axially of said coil for a portion of its length in spaced relation thereto; a laminated metallic T-shaped structure having a pair of legs extended axially of said coil for a portion of its length in spaced relation thereto, the trunk of said T being slidably projected into said coil, the relative lengths of said coil and said legs being such that upon energizing of said coil said first-mentioned legs will engage said second-mentioned legs to provide a fully sealed field around said coil; a pusher rod connected to said trunk and slidably projected through an opening formed in the bight of said U-shaped member; and a pair of channel-shaped side legs connected at one of their ends to said U-shaped members; a metallic end plate connecting said channel-shaped legs together adjacent their opposite ends; means for insulating said coil from said metallic parts and means for mounting said coil in fixed relation relatively to said U-shaped member.

4. A solenoid of the class described, comprising: a coil; an end plate mounted on each end of said coil; means for insulating said coil from said end plates; a supporting structure embodying a U-shaped frame comprising a pair of legs connected together at one of their ends by a bight; an engaging portion mounted on said frame adjacent the free ends of said legs and engaging one of said end plates and supporting said coil in said frame; means for insulating the other of said end plates from the bight of said frame, said engaging portions retaining said coil in fixed relation to said frame; a frame end plate mounted on said frame at the free ends of said legs; and common means for securing said engaging portions and said frame end plate on said frame.

5. A solenoid of the class described, comprising: a coil; an end plate mounted on each end of said coil; means for insulating said coil from said end plates; a supporting structure embodying a U-shaped frame comprising a pair of legs connected together at one of their ends by a bight; an engaging portion mounted on said frame adjacent the free ends of said legs and engaging one of said end plates and supporting said coil in said frame; means for insulating the other of said end plates from the bight of said frame, said engaging portions retaining said coil in fixed relation to said frame; a frame end plate mounted on said frame at the free ends of said legs; common means for securing said engaging portions and said frame end plate on said frame; and opening bearing means projecting outwardly from said bight for the reception of securing means for fastening said frame to a supporting structure.

6. A solenoid of the class described, comprising: a coil; an end plate mounted on each end of said coil; means for insulating said coil from said end plates; a supporting structure embodying a U-shaped frame comprising a pair of legs connected together at one of their ends by a bight; an engaging portion mounted on said frame adjacent the free ends of said legs and engaging one of said end plates and supporting said coil in said frame; means for insulating the other of said end plates from the bight of said frame, said engaging portions retaining said coil in fixed relation to said frame; a frame end plate mounted on said frame at the free ends of said legs; common means for securing said engaging portions and said frame end plate on said frame; and means on said end plates for preventing lateral shifting of said coil relative to said frame in one direction.

7. In a solenoid of the class described: a solenoid coil; a supporting frame embracing said coil and comprising a U-shaped structure embodying a pair of oppositely disposed parallel legs each having an inner face and connected at one of their ends by a bight; a metallic core slidably mounted in said coil; a metallic cross-head mounted on one end of said core and extending laterally therefrom at opposite sides thereof; a mounted leg on each end of said cross-head and extended parallel to, in spaced relation to, said core exterior of the coil and engageable at their outer faces with the inner faces of said frame for providing a sealed field around said coil upon the energizing of the same; means on said frame adjacent the free ends of the legs of said frame for engaging and retaining said coil in position in said frame; an end plate for said frame lying between said legs at the free ends thereof; and common means for securing said end plate and said engaging means in fixed relation to said frame.

8. In a solenoid of the class described: a solenoid coil; an end plate mounted on each end of said coil; means for insulating said end plates from said coil; a supporting frame embodying a U-shaped structure having a pair of parallel side legs connected at one of their ends by a bight; an insulating member lying between the inner face of said bight and one of said end plates; outward projections on said end plate for engaging said insulation and preventing lateral shifting of said coil relatively to said bight; outward projections on the other of said end plates; engagement members engageable with the other of said end plates for clamping said first named end plate against said insulating member; a frame end plate lying between said frame legs adjacent the free ends thereof; and common means for securing said frame end plate and said engagement members on the legs of said frame.

HARRY G. KIPKE.

REFERENCES CITED

The following references are of record in the file of this patent:

UNITED STATES PATENTS

| Number | Name | Date |
|---|---|---|
| 506,282 | Timmis | Oct. 10, 1893 |
| 735,755 | Green | Aug. 11, 1903 |
| 1,482,212 | Barbarou | Jan. 29, 1924 |
| 2,273,212 | Matthias | Feb. 17, 1942 |
| 1,838,836 | Jeffrey | Dec. 29, 1931 |
| 2,360,744 | Van Valkenburg | Oct. 17, 1944 |

FOREIGN PATENTS

| Number | Country | Date |
|---|---|---|
| 652,903 | Germany | Nov. 10, 1937 |